United States Patent [19]

Williams

[11] Patent Number: 5,274,576

[45] Date of Patent: Dec. 28, 1993

[54] APPARATUS FOR MEASURING THE YAW RATE OF A VEHICLE

[75] Inventor: David A. Williams, Milton Keynes, United Kingdom

[73] Assignee: Group Lotus PLC, Hethel, England

[21] Appl. No.: 773,857

[22] PCT Filed: Apr. 20, 1990

[86] PCT No.: PCT/GB90/00607

§ 371 Date: Dec. 9, 1991

§ 102(e) Date: Dec. 9, 1991

[87] PCT Pub. No.: WO90/12698

PCT Pub. Date: Nov. 1, 1990

[30] Foreign Application Priority Data

Apr. 21, 1989 [GB] United Kingdom ............... 8909074

[51] Int. Cl.⁵ .................. B60G 17/01; G01C 25/00
[52] U.S. Cl. ................. 364/565; 364/424.05; 364/571.01
[58] Field of Search ............ 364/424.05, 565, 575, 364/571.01, 571.02; 73/1 D, 516 LM; 280/707, 772

[56] References Cited

U.S. PATENT DOCUMENTS

| | | | |
|---|---|---|---|
| 4,470,124 | 9/1984 | Tagami et al. | 364/571.02 |
| 4,761,022 | 8/1988 | Ohashi et al. | 280/772 |
| 4,967,865 | 11/1990 | Schindler | 364/424.05 |
| 5,001,636 | 3/1991 | Shiraishi et al. | 364/424.05 |
| 5,078,226 | 1/1992 | Inagaki et al. | 364/424.05 |
| 5,102,162 | 4/1992 | Okuda et al. | 364/424.05 |
| 5,159,553 | 10/1992 | Karnopp et al. | 364/424.05 |

FOREIGN PATENT DOCUMENTS 0114757 8/1984 European Pat. Off. .

Primary Examiner—Gary Chin
Attorney, Agent, or Firm—Westman, Champlin & Kelly

[57] ABSTRACT

An apparatus for measuring the yaw rate of a vehicle, comprising a device for measuring the velocity of the vehicle, a device for measuring the lateral acceleration of the vehicle, and a device for measuring the steering angle of the vehicle, a correction device, and a yaw gyrometer. The correction device acts to remove bias errors from the output of the yaw gyrometer. The correction device also estimates the bias errors when the velocity of the vehicle is within a tolerance of zero or when both the steering angle of the vehicle is within a tolerance of zero and the lateral acceleration of the vehicle is within a tolerance of zero.

7 Claims, 2 Drawing Sheets

APPARATUS FOR MEASURING THE YAW RATE OF A VEHICLE

BACKGROUND OF THE INVENTION

This invention relates to apparatus for measuring the yaw rate of a vehicle and an active or semi-active suspension system incorporating such apparatus.

In EP-A-0114757 there is disclosed a vehicle control system for a wheeled land vehicle, comprising wheel suspension devices in the form of double-acting hydraulic actuators by which the wheels are mounted to the body of the vehicle. The suspension devices are controlled by signals representing heave, pitch, roll and warp modes of movement of the vehicle, possibly modified by signals representing the speed and lateral and longitudinal acceleration for the Vehicle, to obtain a desired ride quality and attitude for the vehicle, the signals being derived from appropriate transducers located at appropriate positions on the vehicle.

In U.S. Pat. No. 4,761,022 there is disclosed a similar control system which also includes steering angle and yaw rate sensors on the vehicle, the signals from these sensors being used to control the steering characteristics of the vehicle. As disclosed, the yaw rate sensor can be a rate gyrometer, a vibration gyrometer or an optical fiber gyrometer.

The accuracy to which the vehicle steering characteristics can be controlled depends directly upon the accuracy of the sensors employed, in particular upon the stability of the yaw rate sensor output signal. This feature has, in the past, caused high quality, and therefore high cost, rate sensors to be employed for the stated purpose. Such sensors are generally fragile when unpowered and can have other undesirable features, such as large physical dimensions and high levels of acoustic emission.

There has recently become available a solid state rate gyrometer which is physically small, has minimal acoustic emissions when operating, has been demonstrated to be of rugged construction, and offers the potential for low unit cost in high volume production. All of these features make the gyrometer eminently suitable for application in a vehicle control system as discussed above.

A wheeled land vehicle generally provides a harsh working environment, including large changes in temperature. The output signal of the solid state rate gyrometer has been found to be affected by changes in ambient temperature to an extent that the performance of a vehicle control system which incorporated the sensor could prove to be unacceptable.

SUMMARY OF THE INVENTION

According to the present invention there is provided and apparatus for measuring a yaw rate of a vehicle comprising a gyrometer which can provide an output signal corresponding to the yaw rate of the vehicle, measuring means for measuring a velocity, a steering angle and a lateral acceleration of the vehicle and correction means, for removing bias errors from the output signal of the gyrometer wherein said correction means measures the bias errors when both the steering angle of the vehicle is within a tolerance of zero, and the lateral acceleration of the vehicle is within a tolerance of zero.

Preferably the correction means estimates the bias errors by measuring the output signal of the gyrometer when both the steering angle of the vehicle is within a tolerance of zero and the lateral acceleration of the vehicle is within the tolerance of zero.

Preferably the measuring means periodically measures the velocity, the steering angle and the lateral acceleration of the vehicle.

Preferably the correction means filters the output signal of the gyrometer to remove high frequencies therefrom. The correction means preferably filters the output signal by integrating the signal over a sampling period of the measurement means and multiplying the integrated signal by a factor proportional to the sampling period.

BRIEF DESCRIPTION OF THE DRAWINGS

Preferred embodiments of the present invention will now be described, with reference to the accompanying drawings in which.

DETAILED DESCRIPTION OF THE PREFERRED EMBODIMENTS

Figure 1:
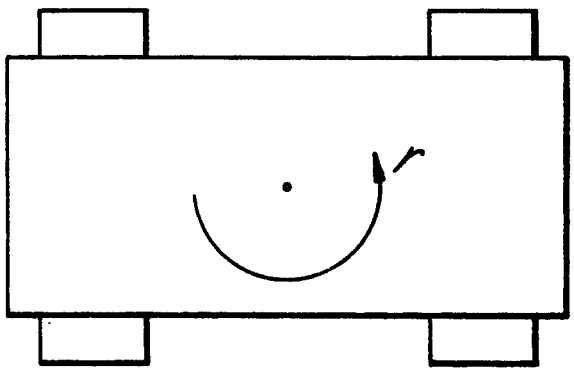
FIG. 1 is a schematic representation of a four wheeled land vehicle.

Referring to FIG. 1, it can be seen that the yaw rate $r$ of a vehicle is the rate at which the vehicle rotates above a fixed point on the vehicle.

Figure 2:
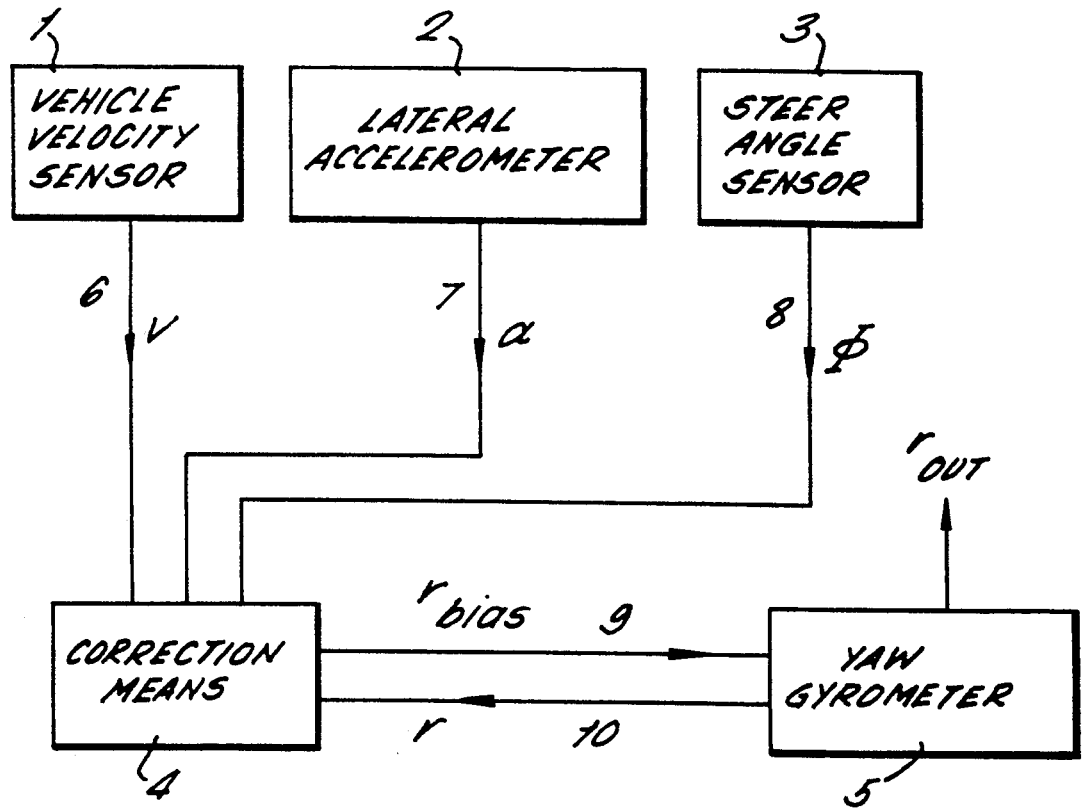
FIG. 2 is a schematic representation of the apparatus according to the invention.

Referring to FIG. 2, it can be seen that a preferred embodiment of the invention comprises measuring means including means for measuring vehicle velocity 1, means for lateral acceleration of the vehicle 2 and means for measuring the steering angle of the vehicle 3, as well as correction means 4 and a yaw gyrometer 5. The means for measuring vehicle velocity V comprises means for measuring the rotational speed of a wheel of a vehicle and calculating from this the velocity of the vehicle and means for producing an output signal corresponding to the velocity of the vehicle. The output signal from the velocity measuring means 1 is transmitted via a line 6 to the correction means 4.

The lateral acceleration measuring means 2 measures the acceleration experienced by the vehicle in a direction perpendicular to the direction of vehicle motion, such acceleration being commonly experienced by the vehicle upon cornering. The lateral acceleration measuring means 2 outputs a signal corresponding to the lateral acceleration experienced by the vehicle and this signal is sent along line 7 to the correction means 4.

The steering angle $\Phi$ of a vehicle is proportional to the angles that the front wheels of the vehicle make to a plane parallel with the axis of the vehicle. This steering angle $\Phi$ is commonly determined by measuring the rotation of the steering wheel of a vehicle (from an arbitrary point of fixed reference) by the driver of the vehicle. A signal corresponding to the steering angle is sent by the steering angle measuring means 3 via a line 8 to the correction means 4.

The correction means 4 periodically samples the three signals sent by lines 6, 7 and 8. The period of sampling should be regular, but can be of arbitrary length, the sampling period being only limited by the practicalities of sampling. Having sampled the three inputs from lines 6, 7 and 8, the correction means 4 determines whether $V=0$ or both $A=0$ and $\Phi=0$. If either of the conditions exist, then the correction means 4 samples also the output of the yaw gyrometer 5. The output of the yaw gyrometer 5 corresponds to the yaw rate of the vehicle measured by the gyrometer. Since the yaw rate of the vehicle should be zero when the velocity of the vehicle is zero, or when both the steering angle $\Phi$ and the lateral acceleration A of the vehicle are zero, then it is possible to determine the bias errors of the signal produced by the gyrometer 5. The estimated bias errors are then stored in the memory of the correction means 4 and is removed from the actual output signal of the gyrometer $r_g$ to provide a corrected output signal $R_{out}$.

Figure 3:
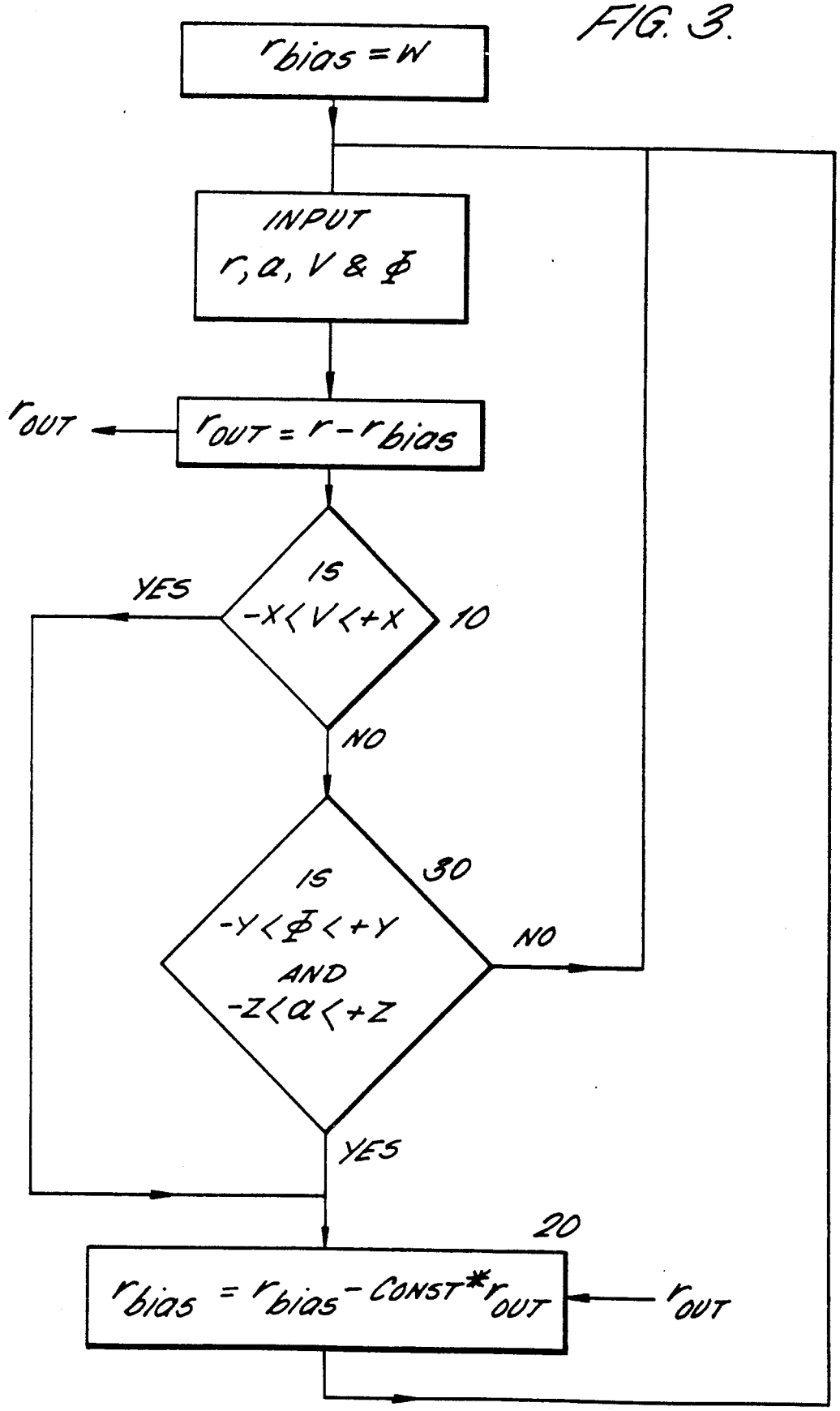
FIG. 3 is a flow chart showing the steps of the invention.

FIG. 3 shows a flow chart detailing the missive operation of the correction means. Initially the bias errors are given an arbitrary value W. The correction means then inputs the values of yaw rate, lateral acceleration, velocity and steering angle measured by the gyrometer and the measuring means. The correction means then corrects the measured yaw rate signal $r_g$ by subtracting the bias errors $r_{bias}$. The corrected signal rout is then output as the corrected output of the apparatus for measuring the yaw rate.

The correction means also samples at regular intervals the three variables velocity V, lateral acceleration A and steering angle $\Phi$. The correction means determines firstly whether the velocity measured is within a defined tolerance range of zero. This can be seen in decision box no. 10. If the velocity is within the tolerance range, then the correction means resets the error bias signal, as shown in box 20. The operation of box 20 is discussed later in the specification.

If the velocity is not within the acceptable tolerance range then the correction means decides whether the lateral acceleration of the vehicle is within a defined tolerance range and also whether the steering angle of the vehicle is within a defined tolerance range. This can be seen in decision box 30. If both the steering angle and the lateral acceleration of the vehicle are within their respective tolerance ranges, then the correction means resets the bias error signal, as shown in box 20.

If the velocity is not within the defined tolerance range of zero and both the lateral acceleration and the steering angle of the vehicle are also not within their respective tolerance ranges of zero, then the error bias signal remains unaltered.

The control system of the invention derives from the appreciation that a compensation for any error in the output signal from the gyrometer is possible in a wheeled land vehicle because, in general, such a vehicle will have a zero yaw rate when the vehicle is stationery, that is when V is zero, or travelling in a straight line, that is when the steering angle $\Phi$ is zero, and the vehicle has zero lateral acceleration A.

Thus, as shown in FIG. 3, $$r_{out} = r_g - r_{bias}$$

where $r_{out}$ = corrected output of the gyrometer
$r_g$ = actual output of the gyrometer
$r_{bias}$ = bias error in output of the gyrometer Provided
either $$-X < V < +X$$

or Both $$-Y < \Phi < +Y$$

and $$-Z < A < +Z$$

where V = velocity of vehicle
$\Phi$ = steering angle of vehicle
A = lateral acceleration of vehicle then $$r_{bias} = r_{bias} + const.*r_c$$

where const. = integration scale factor for use in correction

The range $-X$ to $+X$ is the tolerance range for the measured velocity V. The range $-Y$ to $+Y$ is the tolerance range for the measured steering angle $\Phi$. The range $-Z$ to $+Z$ is the tolerance range for the measured lateral acceleration As shown above and in box 20 of FIG. 3, when the bias error term is reset, it is reset as being the sum of the old bias error term and the factor; const $r_c$. The box 20 acts as a digital low pass filter. The system is only interested in long term bias errors, those due for instance to changes in the ambient temperature of the yaw gyrometer. High frequency fluctuations will occur due to noise and ambient conditions whilst the vehicle is in motion. It is a feature of the present invention that the bias error term ignores such high frequency inputs when determining the bias error of the gyrometer. If such filtering did not occur then the bias error term could be substantially incorrect, having taken into account transient peaks rather than low frequency alterations in the output of the yaw gyrometer. The filtering of the signal can be carried out either by analogue low pass filter or by digitally filtering the yaw rate signal. To digitally filter the yaw rate signal, the signal could first be converted to the frequency domain by suitable transformation, so that the higher frequencies could be removed. Alternatively, the signal could be summed over the sampling period and divided by a constant proportional to the sampling period, so that an average value of the bias error is obtained rather than an instantaneous value.

The system of the invention can readily be incorporated in an overall control system as described in the prior documents mentioned above, the correction means being the processing means used in such system, and thus a complete description of the system will not be given herein.

What is claimed is:

1. Apparatus for measuring a yaw rate of a vehicle comprising a gyrometer which can provide an output signal corresponding to the yaw rate of the vehicle, measuring means for measuring a velocity, a steering angel and a lateral acceleration of the vehicle; and correction means for removing bias errors from the output signal of the gyrometer, wherein said correction means measures the bias errors when the velocity of the vehicle is substantially zero and both the steering angle of the vehicle and the lateral acceleration of the vehicle are within a tolerance of zero.

2. Apparatus for measuring the yaw rate of a vehicle as claimed in claim 1 wherein the correction means estimates the bias errors by measuring the output signal of the gyrometer when both the steering angle of the vehicle is within a tolerance of zero, and the lateral acceleration of the vehicle is within a tolerance of zero.

3. Apparatus for measuring the yaw rate of a vehicle as claimed in claim 2 wherein said measuring means periodically measures the velocity, the steering angle and the lateral acceleration of the vehicle.

4. Apparatus for measuring the yaw rate of a vehicle as claimed in claim 3 wherein the correction means filters the output signal of the gyrometer to remove high frequencies therefrom.

5. Apparatus for measuring the yaw rate of a vehicle as claimed in claim 4 wherein the output signal is filtered by integrating the signal over a sampling period of the measuring means and multiplying the integrated signal by a factor proportional to the sampling period.

6. Apparatus for measuring a yaw rate of a vehicle comprising a gyrometer which can provide an output signal corresponding to the yaw rate of the vehicle; measuring means for measuring a velocity, a steering angle and a lateral acceleration of the vehicle and correction means for removing bias errors from the output signal of the gyrometer; wherein said correction means measures the bias errors when each of the following conditions and (b) is present (a) the velocity of the vehicle is substantially zero, (b) both the steering angle and the lateral acceleration of the vehicle are substantially zero.

7. Apparatus for measuring the yaw rate of a vehicle as claimed in claim 6 wherein the correction means estimates the bias errors by measuring the output signal of the gyrometer when each of the conditions (a) and (b) is met.

* * * * *

UNITED STATES PATENT AND TRADEMARK OFFICE
CERTIFICATE OF CORRECTION

PATENT NO. : 5,274,576
DATED : December 28, 1993
INVENTOR(S) : Williams

It is certified that error appears in the above-indentified patent and that said Letters Patent is hereby corrected as shown below:

Column 4, line 58, cancel "angel" and insert --angle--

Column 6, line 3, after "should be vehicle" insert --;--

Column 6, line 7, cancel "conditions and (b) is present (a) the" and insert --conditions (a) and (b) is present, (a) the--

Signed and Sealed this

Third Day of May, 1994

*Attest:*

BRUCE LEHMAN

*Attesting Officer*  Commissioner of Patents and Trademarks